(12) United States Patent
Leibfritz

(10) Patent No.: US 12,517,071 B2
(45) Date of Patent: Jan. 6, 2026

(54) MEASUREMENT OBJECT AND METHOD FOR VERIFYING A CALIBRATION OF AN X-RAY FLUORESCENCE DEVICE

(71) Applicant: Helmut Fischer GmbH Institut fuer Elektronik und Messtechnik, Sindelfingen (DE)

(72) Inventor: Martin Leibfritz, Deckenpfronn (DE)

(73) Assignee: Helmut Fischer GmbH Institut fuer Elektronik und Messtechnik, Sindelfingen (DE)

( * ) Notice: Subject to any disclaimer, the term of this patent is extended or adjusted under 35 U.S.C. 154(b) by 193 days.

(21) Appl. No.: 18/574,017

(22) PCT Filed: Jun. 23, 2022

(86) PCT No.: PCT/EP2022/067270
§ 371 (c)(1),
(2) Date: Dec. 23, 2023

(87) PCT Pub. No.: WO2022/269002
PCT Pub. Date: Dec. 29, 2022

(65) Prior Publication Data
US 2024/0310308 A1    Sep. 19, 2024

(30) Foreign Application Priority Data
Jun. 23, 2021    (DE) .......................... 102021116258.0

(51) Int. Cl.
*G01N 23/2206*    (2018.01)
*G01N 23/223*    (2006.01)

(52) U.S. Cl.
CPC ....... *G01N 23/2206* (2013.01); *G01N 23/223* (2013.01); *G01N 2223/076* (2013.01); *G01N 2223/1016* (2013.01)

(58) Field of Classification Search
None
See application file for complete search history.

(56) References Cited

U.S. PATENT DOCUMENTS

| | | | |
|---|---|---|---|
| 5,425,066 A | 6/1995 | Takahashi et al. | |
| 6,231,231 B1* | 5/2001 | Farrokhnia | A61B 6/583 378/207 |
| 2004/0227069 A1* | 11/2004 | Sendai | G06T 7/0012 250/252.1 |
| 2008/0192897 A1* | 8/2008 | Piorek | G01N 23/223 378/102 |

(Continued)

FOREIGN PATENT DOCUMENTS

| | | |
|---|---|---|
| CN | 101551347 B | 2/2012 |
| DE | 19836884 C1 | 6/2000 |

(Continued)

*Primary Examiner* — Hoon K Song
(74) *Attorney, Agent, or Firm* — KRIEGSMAN & KRIEGSMAN

(57) ABSTRACT

Measurement object and method for verifying a calibration of an X-ray fluorescence device, wherein the measurement object has a main body and at least one marking arranged on the main body, the marking being formed from a different material to the main body, and the marking is assigned at least one further layer, which, upon impingement by X-ray radiation, emits electromagnetic radiation with deviating intensities.

19 Claims, 4 Drawing Sheets

(56) References Cited

U.S. PATENT DOCUMENTS

Figure 1:
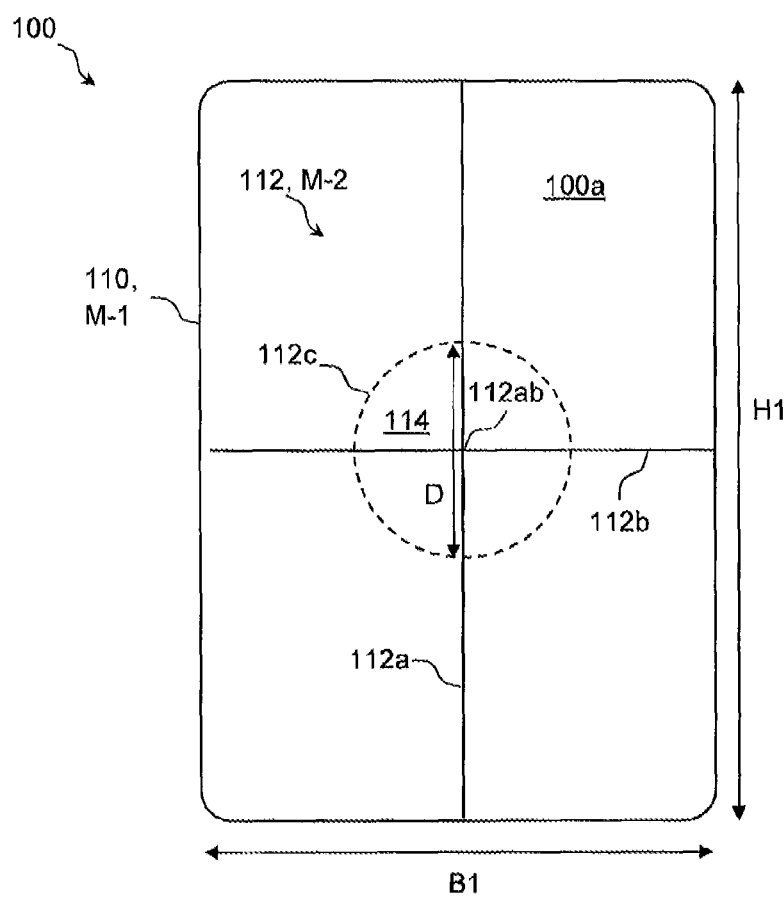

2009/0048510 A1     2/2009   Miller et al.
2018/0328868 A1    11/2018   Bykanov et al.

FOREIGN PATENT DOCUMENTS

| DE | 10013012 A1 | 9/2000 |
| JP | 2001153817 A | 6/2001 |
| JP | 2004216013 A | 8/2004 |
| JP | 2008286554 A | 11/2008 |
| WO | 2017023635 A1 | 2/2017 |

\* cited by examiner

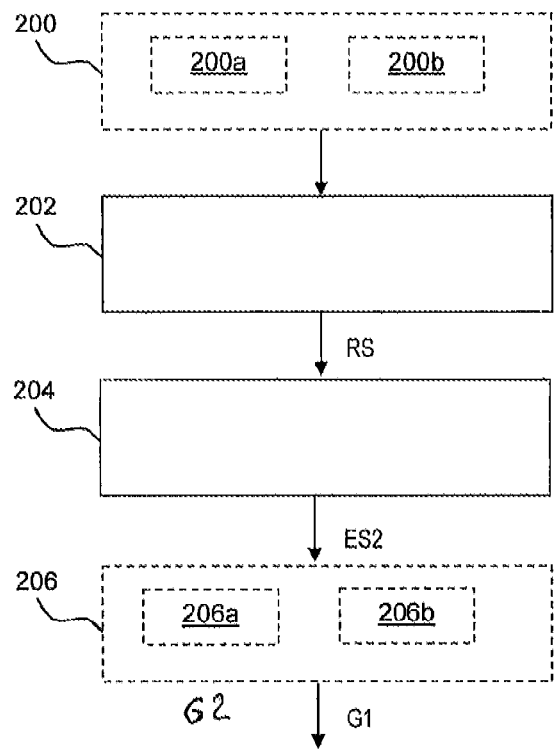
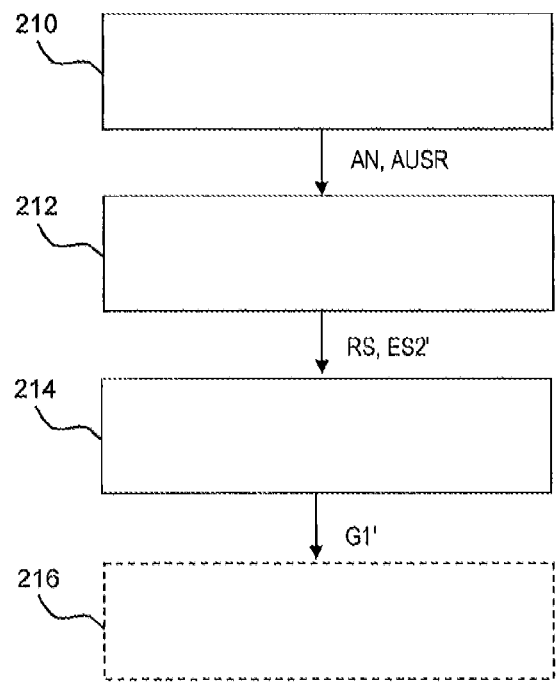

MEASUREMENT OBJECT AND METHOD FOR VERIFYING A CALIBRATION OF AN X-RAY FLUORESCENCE DEVICE

The invention relates to a measurement object and a method for verifying a calibration of an X-ray fluorescence device.

Document CN 101 551 347 B provides a calibration standard for the initial alignment of a spot of X-ray radiation in an X-ray fluorescence device. This calibration standard is designed as a plate with two longitudinal slits which are aligned at right angles to each other. By moving the calibration standard on a table of the X-ray fluorescence device, the intensities of the emitted X-ray fluorescence radiation in the region of the plate and in the region of the slit are detected in order to align the spot of the X-ray radiation.

Document DE 198 36 884 C1 also discloses a method and a sample part for determining the intensity data of a measurement spot in an X-ray fluorescence analysis. The sample part consists of a surrounding material and a probe with a defined contour arranged within the surrounding material. The surrounding material and the material of the probe have the same linear attenuation coefficient for the emitted X-ray fluorescence radiation. By moving the sample part on the measuring table, both the centre of intensity and the contour of the measurement spot of the X-ray fluorescence source can be determined.

An X-ray fluorescence analyser is known from JP 2008-286 554 A. A camera is provided for determining a position of a sample on the measuring table, wherein an image of the position of the sample on the measuring table is captured and analysed before and after closing a lid of the X-ray fluorescence analyser.

An X-ray fluorescence analyser is known from document DE 100 13 012 A1. As a preparatory process for carrying out the X-ray fluorescence analysis, a sample is positioned in an optical sample observation system, wherein the sample is irradiated with an X-ray beam. As a determination process, an image of the sample is captured, wherein the luminance of a material A and another material B, which are adjacent to each other in the sample and each form a linear interface, is detected. It is then determined whether or not the X-ray beam irradiated onto the sample partially passes the sample.

The object of the invention is to propose a measurement object for verifying a calibration of an X-ray fluorescence device, which measurement object enables simple and rapid verification. A further object of the invention is to propose a method for verifying a calibration of an X-ray fluorescence device, which method can be carried out in a simple manner.

This object is achieved by a measurement object for verifying a calibration of an X-ray fluorescence device, which measurement object comprises a main body and at least one marking arranged on the main body, wherein the main body is formed from a first material and the marking, which is provided on or in the main body, is formed from a second material which is different from the first material. Furthermore, it is provided in the measurement object that the main body has a layer at least in some areas which is aligned with the marking. When this layer and the marking are at least partially exposed to the X-ray radiation, the layer emits or reflects an intensity of electromagnetic radiation in a predetermined wavelength range and the marking emits an intensity of predetermined X-ray fluorescence radiation. This enables characteristic intensities of the reflected or emitted radiation of the layer and the marking to be detected by the layer, which is provided at least in some areas and is aligned with the marking, after the exposure to X-ray radiation. These intensities can be analysed in the X-ray fluorescence device.

In a data processing device of the X-ray fluorescence device, reference data of the various intensities are advantageously stored both for the layer which is assigned to the marking or is aligned with the marking and with respect to the marking on the basis of the material selection thereof, said reference data being compared with the data determined by a detector for the emitted X-ray fluorescence of the marking and by a detector, in particular of an optical detection device, for the reflected or emitted electromagnetic radiation of the layer. Ideally, if the detected intensities of the layer and of the marking match the stored reference data or intensities, it can be assumed that the X-ray source, the at least one collimator or the X-ray optics for guiding the X-ray beam, the detector for detecting the X-ray fluorescence and the optical device for detecting the measurement object are calibrated to a target state. This means that a light field and X-ray field can be checked simultaneously by the measurement object. If the intensity of the emitted radiation from the layer and/or the marking deviates from the respective predetermined intensities of the layer and marking, it is necessary to readjust the X-ray fluorescence device and/or the measurement object or its position on a measuring table of the X-ray fluorescence device, as a change has occurred compared to an original calibration of the X-ray fluorescence device, for example after delivery due to transport or during operation due to temperature influences, for example.

It is preferable that the second material is a heavy metal, for example lead. In particular, it is provided that the first material is not a heavy metal.

The first material of the main body may comprise at least one of the following materials: a) PTFE, polytetrafluoroethylene, b) PMA, polymethyl acrylate, c) PMMA, polymethyl methacrylate, d) PC, polycarbonate, e) PE, polyethylene.

Advantageously, the first material of the main body can have a comparatively high purity, for example no additives, in particular no colouring and/or metallic additives.

When exposed to X-ray radiation, the first material of the main body can emit comparatively low X-ray fluorescence emissions compared to the second material of the marking.

The layer, which is aligned or assigned for marking in and/or on the main body, can be designed as a fluorescent coating.

Preferably, the predeterminable or predetermined wavelength range of this layer is in a range between 300 nm and 1100 nm (nanometres), in particular between 400 nm and 800 nm, e.g. in a wavelength range visible to humans, which enables simple optical perception by a user and/or detection by means of an image detector, e.g. a digital camera operating in the same or at least a similar wavelength range.

Alternatively, the predeterminable or predetermined wavelength range can lie outside the wavelength range visible to humans and can be detected, for example, by means of a suitable digital camera, e.g. having at least one image sensor with corresponding spectral sensitivity. The image sensor can, for example, be of the CCD (charge coupled device) type or of the CMOS (complementary metal oxide semiconductor) type or can be of another type.

The marking can have at least two intersecting lines, in particular intersecting straight lines, which are preferably aligned orthogonally to each other. This can also facilitate and/or accelerate alignment of the object to be measured on a measuring table of the X-ray fluorescence device with respect to the detector, in particular the optical detection device.

The marking can have at least one circle. In particular, the at least two intersecting lines or straight lines are arranged in the circle concentrically to a point of intersection. The advantage of the marking as a circle can be analogous to that of the intersecting lines.

The layer is preferably arranged inside the circle. In particular, the layer covers the entire area of the circle.

The measurement object can have a platelet shape, wherein a thickness of the measurement object is smaller than at least one outer dimension of the measurement object along a direction perpendicular to the thickness. For example, the thickness of the measurement object can be smaller than a width and a height of the measurement object. of a surface of the measurement object that has the marking.

The measurement object can be placed manually and/or automatically on a sample table or measuring table of the X-ray fluorescence device. The sample table can be designed as a so-called automatic sample table, which enables movement of a table top or of the measurement object arranged thereon by means of a motorised drive.

The object addressed by the invention is further solved by a method according to the features of claim 14 for calibrating an X-ray fluorescence device. For this purpose, a measurement object according to one of the preceding embodiments is used. The measurement object is positioned in the X-ray fluorescence device. The measurement object is then exposed to the X-ray radiation at least temporarily. This is followed by the detection of a first quantity with an intensity of electromagnetic radiation emitted by the layer on the marking of the measurement object. Furthermore, a first quantity with an intensity of electromagnetic radiation emitted by the marking of the measurement object can be detected by a detector. Subsequently, a match or a difference (DS) of the detected first quantity from the layer of the measurement object as compared to a predetermined intensity from the layer is determined and/or a match or difference (DM) of the detected first quantity of the marking of the measurement object as compared with the predetermined intensity of the marking of the measurement object is detected. When determining at least one difference (DM, DS), an alignment or readjustment of the measurement object of the X-ray device or a readjustment of the at least one detector, of the at least one collimator, of the X-ray optics and/or of the X-ray source of the X-ray fluorescence device is performed. Thus, by checking the first quantity of the layer with a detector for the predetermined wavelength range of the layer and checking the first quantity of the marker with a detector for the X-ray fluorescence radiation of the marker, it is possible to simultaneously verify whether and to what extent an adjustment is required. The operator of the X-ray fluorescence device can therefore immediately see any adjustment that may be required. In addition, the operator or the control system of the X-ray fluorescence device can receive an indication via a display or a display device as to which components of the X-ray fluorescence device need to be realigned.

It is preferably provided that when the detected intensity IS1 corresponds to the predetermined intensity IS of the layer of the measurement object within a tolerance range and when a difference DM with respect to the marking is determined, it is established that the X-ray source, the at least one collimator or the X-ray optics and/or the detector detecting the X-ray fluorescence radiation must be readjusted and the detector for the electromagnetic radiation of the layer is still properly calibrated for the predetermined wave range. As a result, it is possible to verify, with just a single exposure of the measurement object to X-ray radiation, whether the optical device for detecting the position of a measurement object on the measuring table is misaligned and/or whether the X-ray source, the at least one collimator or the X-ray optics and/or the detector for detecting the X-ray fluorescence needs to be readjusted.

Furthermore, it is preferably provided that when determining a match of the detected intensity IRf1 with the predetermined intensity IRf of the marking within a tolerance range and when determining a difference DS of intensities of the layer, it is determined that the detector for detecting the electromagnetic radiation is misaligned for the predetermined wavelength range. It can thus be determined that the components relating to the X-ray radiation and the X-ray fluorescence radiation do not require readjustment, but rather the readjustment of the optical detection device and/or its optical components is required to localise the position of the measurement object on the measuring table.

Furthermore, it is preferably provided that when determining the difference DS and the difference DM after exposure of the measurement object to the X-ray radiation, the measurement object is first aligned with the detector for detecting the electromagnetic radiation for the predetermined wave range in a first step and, if a match of the detected intensity IS1 with the predetermined intensity IS of the layer is detected, the determination of a match or a difference DM of intensities of the marking is carried out. This method step is carried out in order to ensure that a false statement is avoided if the measurement object is not correctly positioned in relation to the X-ray source and the detector, in particular the optical detection device. If the intensities of the layer of the measurement object match and a difference DM is subsequently determined, the X-ray source, the at least one collimator or the X-ray optics and/or the detector for detecting the X-ray fluorescence radiation must be readjusted.

According to a further advantageous embodiment of the method, it may be provided that, when determining the difference DS and the difference DM, in a first step a calibration of the measurement object on a measurement table to the detector for determining the electromagnetic radiation for the predetermined wave range is carried out and, when further determining the difference DS, the readjustment of the detector for detecting the electromagnetic radiation in the predetermined wave range is determined.

According to a further advantageous embodiment of the method, it may be provided that a table of the X-ray fluorescence device is moved outside a region of the X-ray radiation and that the object to be measured is aligned on the measuring table with the aid of a beam device with visible light, in particular a laser pointer, which is arranged adjacent to and in particular separately from the X-ray source, is aligned on the measuring table and then the measuring table is moved back into the region of the X-ray radiation and that a determination of the match or difference DS of the layer and/or a determination of the match or difference DM of the marking is carried out, wherein a readjustment of the detector for the detection of the electromagnetic beam in the predetermined length range is determined if the difference DS is determined and a readjustment of the beam device with visible light, in particular the laser pointer, is determined if the difference DM is determined. This allows a further verification of a possible readjustment of a component of the X-ray fluorescence device to be carried out.

Furthermore, it is preferable for the X-ray source to be aligned with the measurement object and/or vice versa before the measurement object is at least temporarily exposed to X-ray radiation. On the one hand, manual alignment can be provided, wherein in particular the position and/or orientation of the object to be measured is shown on a display or monitor of the X-ray fluorescence device. Alternatively, automatic alignment in particular of the measurement object can be controlled, wherein for this purpose data are processed in a controller of the X-ray fluorescence device in order to realign the position and/or orientation of the measurement object.

Automatic alignment can be based on digital images or a video data stream that is captured by a digital camera or video camera, for example.

Preferably, a pattern recognition method can be used to determine the marking of the measurement object on the digital images or in the video data stream and, if necessary, to determine and/or influence the relative alignment of the X-ray source and the measurement object on this basis, which can increase the precision of the alignment.

If a difference DS or DM is detected, a further process step can preferably be carried out in order to characterise the difference: Varying an arrangement and/or alignment of the measurement object relative to the X-ray source, repeating the at least temporary exposure of the measurement object to the X-ray radiation and the detection of electromagnetic radiation emitted by the at least one component, in particular the layer and the marking of the measurement object, as a result of the exposure of the measurement object to the X-ray radiation, and determining a change in the first quantity based on the detected electromagnetic radiation, and, optionally, varying the arrangement and/or alignment of the measurement object relative to the X-ray source, again based on the change in the first quantity. In this way, a first determination can be made for the position and/or alignment of the X-ray source and the detector associated therewith as well as the further optical device.

To determine the position and/or orientation of the X-ray source relative to the measurement object, the following can be carried out:

determining a plurality of values of the emitted electromagnetic radiation from the at least one component of the measurement object as a result of the exposure of the measurement object to the X-ray radiation, at least two of the plurality of values being associated with a different arrangement and/or alignment of the measurement object relative to the X-ray source in each case, and determining information characterising an alignment, for example misalignment, and/or arrangement of the X-ray source in relation to the measurement object, by means of at least one vector, for example error vector, based on the at least two of the plurality of values. This enables a computational correction or actual change in the setting for the at least one component of the X-ray fluorescence device.

Preferably, the first quantity (or intensity IS1) of the layer of the measurement object was detected by at least one digital image, wherein a digital camera can be used to determine the at least one first quantity.

Preferably, the method comprises: varying an arrangement and/or alignment of the measurement object relative to the X-ray source, repeating the at least temporary exposure of the measurement object to the X-ray radiation and the detection of electromagnetic radiation emitted by the at least one component, in particular the layer and the marking of the measurement object, as a result of the exposure of the measurement object to the X-ray radiation and detected by at least one digital image, and determining a change in the first quantity based on the detected digital images, and varying the arrangement and/or alignment of the measurement object relative to the X-ray source, again based on the change in the first quantity. A misalignment between the X-ray source and the measurement object can be determined from a difference between the first and the second or further digital image, and a vector, in particular an error vector for a correction, can be determined, or it can be determined whether the variation has already led to a desired alignment—instead of the stated misalignment.

The method can further comprise: sending the information characterising the alignment and/or arrangement of the X-ray source in relation to the measurement object to at least one drive unit in order to change an arrangement and/or alignment of the measurement object relative to the X-ray source. This makes it possible, for example, to realise closed-loop control of the arrangement and/or of the alignment of the measurement object relative to the X-ray source.

The method can alternatively or additionally comprise: informing a user, by outputting information on a display of the X-ray fluorescence device, regarding the alignment and/or arrangement of the X-ray source in relation to the measurement object. This enables manual adjustment of the alignment and/or arrangement or enables the user to be informed of a current alignment and/or arrangement.

Preferably, the following steps can be performed: a) providing a measurement object for X-ray fluorescence analysis, b) enabling a, for example, efficient and/or precise alignment and/or arrangement of an X-ray source in relation to the measurement object and/or vice versa, c) ensuring that an optical field of view that can be captured by a camera, e.g. digital camera, corresponds to an area ("X-ray field") that can be exposed to X-ray radiation by the X-ray source, for example independently of any components that may be present in a beam path of the X-ray radiation, e.g. components that change the beam path, such as collimators, filters, diaphragms, d) checking an alignment and/or arrangement of an X-ray source in relation to a, or the, measurement object, e) assisting a user in orienting and/or arranging an X-ray source in relation to the measurement object and/or vice versa, f) selecting a collimator and/or another field-shaping element for arrangement in a beam path of the X-ray radiation, g) correcting an alignment and/or arrangement of an X-ray source in relation to a, or the, measurement object.

Figure 2:
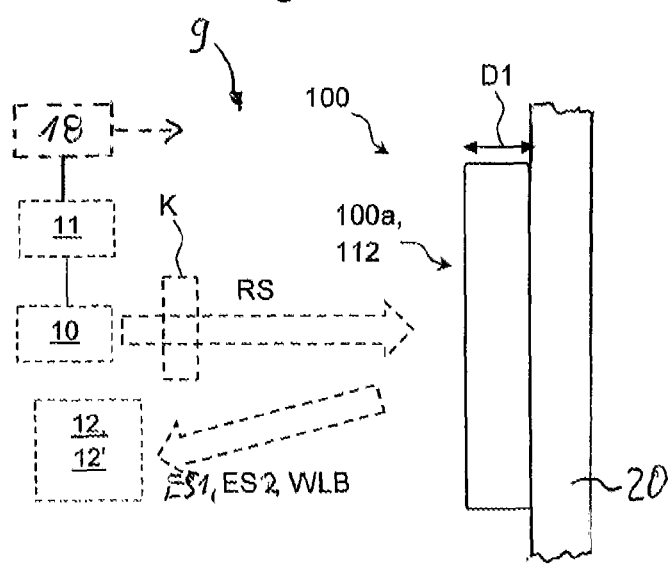
Figure 3:
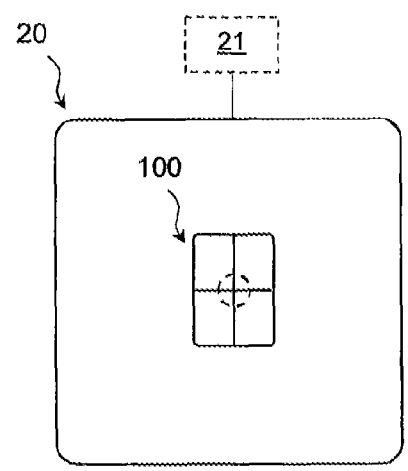
Figure 6:
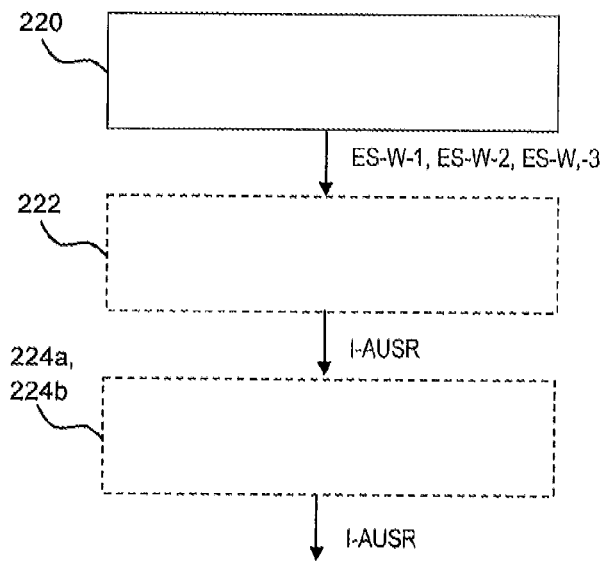
Figure 7:
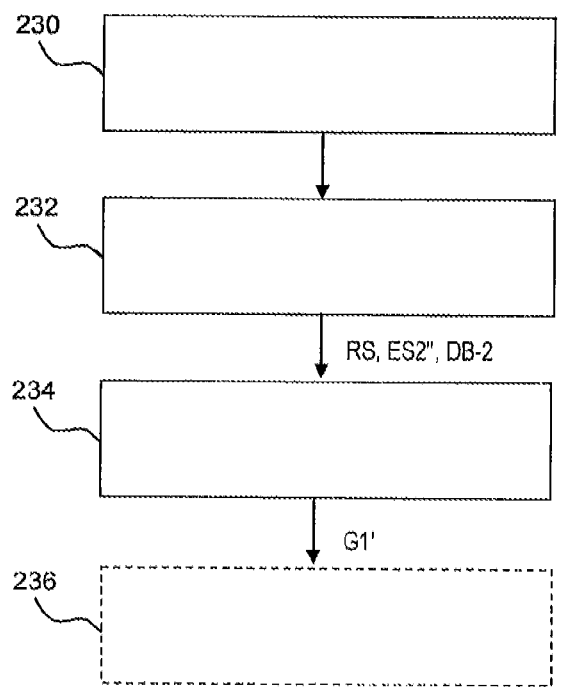
Figure 8:
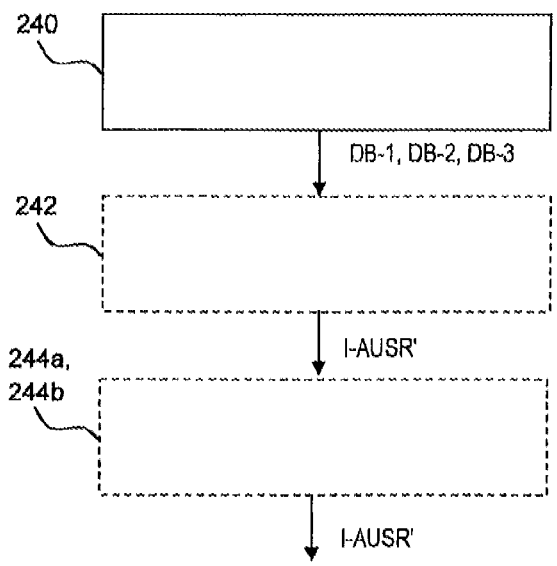
Figure 9:
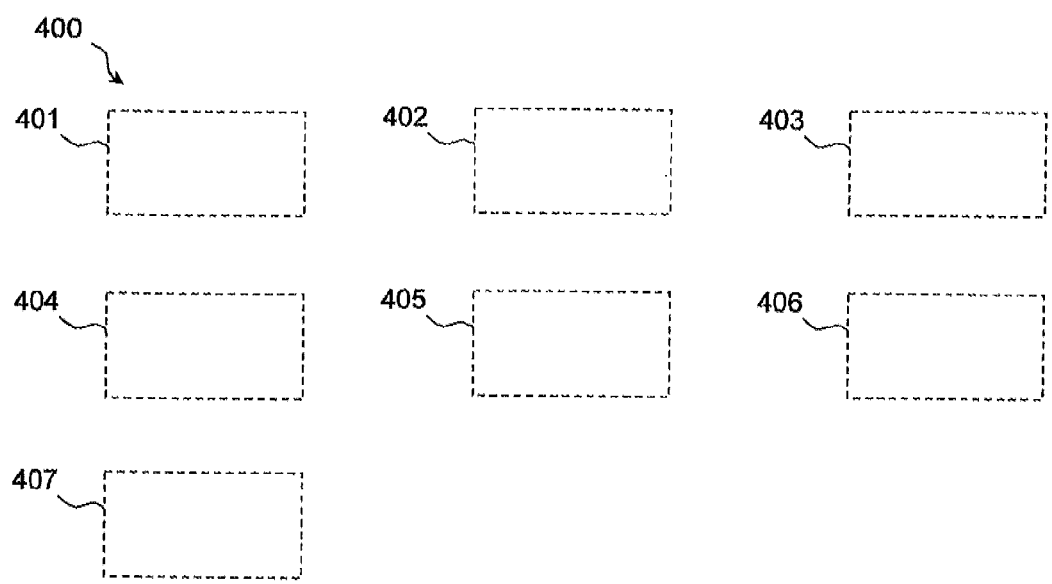

The invention and other advantageous embodiments and developments thereof are described and explained in greater detail below with reference to the examples shown in the drawings. The features to be taken from the description and the drawings can be applied individually or in any combination in accordance with the invention. In the drawings:

FIG. 1 shows a schematic view of a measurement object,

FIG. 2 shows a schematic view of an X-ray fluorescence device with the measurement object, FIG. 3 shows a plan view of a table of the X-ray fluorescence device, FIG. 4 shows a schematic flow diagram of the operation of the X-ray fluorescence device, FIG. 5 shows a schematic flow diagram for determining a first quantity for the alignment and/or arrangement of the measurement object, FIG. 6 shows a schematic for determining information for the determination of an error vector from digital images, FIG. 7 shows a schematic flow diagram for determining the alignment of the measurement object using digital images, FIG. 8 shows a schematic flow diagram for determining information for the determination of an error vector from digital images, and FIG. 9 shows a schematic representation of process steps for calibrating the X-ray fluorescence device.

FIG. 1 shows a view of a measurement object 100 which can be used for the calibration of an X-ray fluorescence device 9 according to FIG. 2. The measurement object 100 has a main body 110 and at least one marking 112 arranged on the main body 110, wherein the main body 110 comprises a first material M-1 and/or is formed from a first material M-1, and the marking 112 is formed from a second material M-2, which is different from the first material M-1. The second material M-2 may be a heavy metal, for example lead. The first material M-1 is preferably not a heavy metal.

The first material M-1 may comprise at least one of the following materials: a) PTFE, polytetrafluoroethylene, b) PMA, polymethyl acrylate, c) PMMA, polymethyl methacrylate, d) PC, polycarbonate, e) PE, polyethylene.

Preferably, the first material M-1 has a comparatively high purity, for example no additives and/or for example no colouring and/or metallic additives.

When exposed to X-ray radiation RS, the first material M-1 emits comparatively low X-ray fluorescence emissions compared to the second material.

FIG. 2 schematically shows an X-ray fluorescence device 9. The X-ray radiation RS is provided by an X-ray source 10.

The electromagnetic radiation ES2 emitted by the measurement object 100 is detected by a detector 12 (e.g. photodetector), e.g. for X-ray fluorescence emissions, and by a detector 12', in particular an optical detection device, e.g. image sensor or digital camera.

The measurement object 100 can be placed on the table 20 or integrated into the table 20.

The measurement object 100 can be placed manually and/or automatically on a sample table 20. The sample table 20 can be designed as a so-called automatic sample table, which enables movement of a table top and of the measurement object 100 arranged or integrated thereon, for example by a motorised drive 21.

A beam device 18 with visible light, in particular a laser pointer, can also be provided for aligning the measurement object 100 on the sample table 20 or measuring table 20. This beam device 18 is adjacent to and preferably aligned separately from the X-ray source 10. Advantageously, the beam device 18 can also be connected by means of a drive 11, by means of which the position of the beam device 18 can be changed together with the X-ray source. The beam device 18 for emitting the visible light is oriented in the direction of the sample table 20. This beam device 18 is used in particular in arrangements of an X-ray fluorescence device 9 in which the distance between the X-ray optics or the at least one collimator and the surface of the sample table 20 is small.

To align the measurement object 100 on the measuring table 20, the measuring table 20 can be moved outside an area of X-ray radiation RS. Subsequently, the measurement object 100 can be aligned in the position on the sample table 20 with the aid of the beam device 18. In particular, the marking 112 of the measurement object 100 can have a supporting effect. The measuring table 20 is then returned to the starting position so that the X-ray beam RS strikes the measurement object 100 in order to verify the calibration of the X-ray fluorescence device 9.

The main body 110 (FIG. 1) has a layer 114, at least in some areas, which, when exposed to X-ray radiation RS (FIG. 2), emits electromagnetic radiation ES1 with an intensity IS in a predeterminable wavelength range WLB, which can be detected, for example, by means of the detector 12'.

The layer 114 is preferably a fluorescent coating. The fluorescent coating 114 may comprise one of the following materials: a) rock salt (sodium chloride), b) lithium fluoride, c) potassium chloride, d) $Na_2O_2$ (sodium peroxide).

The predeterminable wavelength range WLB of the layer 114 is in a range between 300 nm and 1100 nm nanometres, in particular between 400 nm and 800 nm, e.g. in a wavelength range visible to humans, which enables, for example, simple optical perception on the part of, for example, a user, and/or detection by means of an image detector 12', e.g. digital camera 12', which operates in the same or at least a similar wavelength range.

Alternatively, it may be provided that the predeterminable wavelength range WLB of the layer 114 is at least partially outside the wavelength range visible to humans, wherein it can be detected, for example, by means of a suitable digital camera 12', e.g. comprising at least one image sensor with corresponding spectral sensitivity, or with a photodetector 12, which may comprise, for example, a PIN diode. The image sensor may, for example, be of the CCD (charge coupled device) type or of the CMOS (complementary metal oxide semiconductor) type or may be of another type.

The marking 112 comprises one of the aforementioned materials M-1, wherein electromagnetic radiation ES1 with an intensity IRf is emitted upon exposure to X-ray radiation RS. In the process, X-ray fluorescence radiation is emitted which comprises a predetermined intensity IRf due to the selection of the material M-1.

The marking 112 according to FIG. 1 can comprise at least two intersecting lines 112a, 112b, for example straight lines, which are aligned orthogonally to one another.

The marking 112 preferably comprises at least one circle 112c, wherein the circle 112c is arranged concentrically to a point of intersection 112ab of the at least two intersecting lines or straight lines 112a, 112b.

The layer 114 can be arranged within the circle 112c. In particular, the layer 114 extends completely within the circle 112c. This enables a particularly precise assessment of an alignment of the X-ray source 10 or X-ray radiation RS with respect to the measurement object 100, in order to determine whether the X-ray radiation RS is orientated concentrically to the circle 112.

The measurement object 100 has a platelet shape, a thickness D1 (FIG. 2) of the measurement object 100 is smaller than at least one external dimension of the measurement object 100 in a direction perpendicular to the thickness D1, wherein, for example, the thickness D1 of the measurement object 100 is smaller than a width B1 (FIG. 1) and a height H1 of the measurement object or a surface 100a of the measurement object 100 that has the marking 112.

FIG. 4 schematically shows a method for operating the X-ray fluorescence device 9 with an X-ray source 10 emitting X-ray radiation RS: At least temporary exposure 202 of a measurement object 100 to the X-ray radiation RS (FIG. 2), detection 204 (FIG. 4) of electromagnetic radiation ES1, ES2 emitted by at least one component 112, 114 of the measurement object 100, for example as a result of the exposure of the measurement object 100 to the X-ray radiation RS, and determination 206 of at least one first quantity G1, G2, characterising an alignment of the X-ray source 10 with the measurement object 100 based on the detected electromagnetic radiation ES1, ES2, by means of the at least one photodetector 12 (FIG. 2) and by means of the at least one digital camera 12'.

The determination of the first quantity G2 by means of the at least one photodetector 12 is shown symbolically in FIG. 4 by block 206a, and the determination of the first quantity G1 by means of the at least one digital camera 12' is shown symbolically in FIG. 4 by block 206b.

The first exposure 202 of the measurement object 100 to X-ray radiation RS is followed by alignment 200: alignment 200, for example manual alignment 200a and/or automatic alignment 200b, of the X-ray source 10 with the measurement object 100 and/or vice versa, by means of the drive 21, and/or manually.

The automatic alignment 200b can be performed based on digital images or a video data stream captured by the digital camera 12' or video camera.

In particular, a pattern recognition method (e.g. "pattern recognition") can be used to determine the marking 112 of the measurement object 100 on the digital images or in the video data stream and, if necessary, to determine and/or influence the relative alignment of the X-ray source 10 and the measurement object 100 with respect to each other on this basis, which may increase the precision of the alignment 200.

To determine the first quantity G1, G2 with an intensity IS and IRf of the electromagnetic radiation ES1, ES2, the following can be provided according to FIG. 5: varying 210 an arrangement AN (e.g. position) and/or alignment AUSR (e.g. angular alignment) of the measurement object 100 relative to the X-ray source 10, repeating 212 the at least temporary exposure 202 (FIG. 4) of the measurement object 100 to the X-ray radiation RS and the detection 204 of electromagnetic radiation ES1', ES2' (FIG. 5) and determining the intensity IS and IRf in front of the marking 112 and the layer 114 of the measurement object 100, as a result of the exposure of the measurement object to the X-ray radiation, and determining 214 a change G1', G2' in the first quantity G1, G2 based on the detected electromagnetic radiation ES1', ES2', and varying 216 the arrangement and/or alignment of the measurement object relative to the X-ray source, again based on the change in the first quantity G1, G2. Optionally, the method or one or more of the blocks 210, 212, 214, 216 may be repeated in further exemplary embodiments, for example until a desired alignment or arrangement is achieved, for example a concentric alignment of the X-ray radiation RS with respect to the point of intersection 112ab (FIG. 1) or the circle 114.

According to FIG. 6, the following is preferably provided: determining 220 a plurality of values ES-W-1, ES-W-2, ES-W-3 characterising an electromagnetic radiation emitted by the marking 112 and the layer 114 of the measurement object 100 as a result of exposure of the measurement object 100 to the X-ray radiation, wherein at least two of the plurality of values ES-W-1, ES-W-2, ES-W-3 are in each case associated with a different arrangement and/or alignment of the measurement object 100 relative to the X-ray source 10, and determining 222 information I-AUSR characterising an alignment, for example misalignment, and/or arrangement of the X-ray source 10 with respect to the measurement object 100, by means of at least one vector, e.g. error vector, based on the at least two of the plurality of values ES-W-1, ES-W-2, ES-W-3.

The first quantity G1 (FIG. 4) can be at least one digital image of the measurement object 100, for example using a digital camera 12' (FIG. 2).

The first quantity G2 can be a frequency spectrum determined by the detector 12 for detecting X-ray fluorescence emissions from the marking 112.

The method according to FIG. 7 can comprise: varying 230 an arrangement and/or alignment of the measurement object 100 relative to the X-ray source, repeating 232 the at least temporary exposure of the measurement object to the X-ray radiation RS and detecting electromagnetic radiation ES2" emitted by the at least one component 112, 114 of the measurement object 100 as a result of the exposure of the measurement object 100 to the X-ray radiation RS, the detection being a recording of at least one further digital image DB-2, and determining 234 a change G1' in the first quantity G1 based on the recorded digital images DB-1, DB-2, and varying 236 the arrangement and/or alignment of the measurement object relative to the X-ray source again based on the change G1' in the first quantity G1. Before varying 230, a first digital image DB-1 can already be recorded, then varying 230 takes place, and then the second or further digital image DB-2 is recorded. Based on a difference between the first and the second digital image, it is possible to determine whether there is still a misalignment between the X-ray source 10 and the measurement object 100, or whether the varying has already led to a desired alignment-instead of the stated misalignment.

The method can further comprise, according to FIG. 8: determining 240 a plurality of digital images DB-1, DB-2, DB-3 characterising electromagnetic radiation emitted by the at least one component 112, 114 of the measurement object 100 as a result of the measurement object being exposed to the X-ray radiation RS, wherein at least two of the plurality of digital images DB-1, DB-2, DB-3 are in each case associated with a different arrangement and/or alignment of the measurement object 100 relative to the X-ray source 10, and determining 242 information I-AUSR' characterising an alignment, for example misalignment, and/or arrangement of the X-ray source 10 with respect to the measurement object 100 by means of at least one vector, e.g. error vector, based on the at least two of the plurality of digital images DB-1, DB-2, DB-3.

In the embodiments according to FIGS. 6 and 8, it is preferably provided that the method comprises: sending 224a; 244a the information I-AUS, I-AUSR' characterising the alignment and/or arrangement of the X-ray source 10 in relation to the measurement object 100 to the drive unit 21 in order to change the arrangement and/or alignment of the measurement object 100 relative to the X-ray source 10. This makes it possible to realise closed-loop control of the arrangement and/or of the alignment of the measurement object relative to the X-ray source.

The method can also comprise the following: informing 224b, 244b, a user, with respect to the information I-AUSR, I-AUSR' characterising the alignment and/or arrangement of the X-ray source with respect to the measurement object. This makes it possible, for example, to manually adjust the alignment and/or arrangement or to inform the user of a current alignment and/or arrangement.

It can also be provided that the alignment 200 (FIG. 4) is performed based on the at least one digital image DB-1.

The method relates in particular to the checking of a match between a light field and an X-ray field using the measurement object 100. This allows a geometric match between the X-ray beam and the optical detection device, in particular digital camera, to be checked in a simple manner. The measurement object 100 is placed manually, for example, on the sample table 20 (FIG. 3) at a predeterminable test position. Alternatively or additionally, the measurement object 100 can be moved to the test position, e.g. using an automatic table. Alternatively or additionally, the measurement object 100 can, for example, already be integrated into the sample table 20 at a predeterminable position, wherein the position of this measurement object 100 is approached in further exemplary embodiments, e.g. for the aforementioned checking of a match between the light and X-ray field.

For exact alignment of the measurement object 100, the marking 112, in the form of a crosshair, of a structure that absorbs X-ray radiation RS (e.g. second material M-2, e.g. lead) can be applied. A concentric ring or circle 112c, e.g. also made of lead or the second material M-2, can be applied around the crosshair 112a, 112b, which, for example, defines a centre 112ab.

The annular diameter D of the circle 112c (FIG. 1) can correspond to a collimator diameter of a collimator K for the X-ray source 10 projected, for example, at a nominal distance of the measuring table 20, as shown in FIG. 2. For example, as shown schematically in FIG. 2, the collimator K is arranged in the beam path of the X-ray radiation RS between the X-ray source 10 and the measurement object 100.

For example, a standard or laser pointer of the X-ray source 10 or an X-ray measuring system containing same is first aligned with respect to the measuring table 20 or the measurement object 100 located thereon or arranged therein, in such a way that, for example, the crosshair 112a, 112b of the measurement object 100 coincides with that of the standard or laser pointer.

Alternatively, pattern recognition algorithms are executed, in which, for example, digital images of the measurement object 100 are recorded by means of the CCD camera 12' and, for example, analysed automatically. This allows the CCD camera to perform a predetermined alignment of the measurement object 100, which can be automated. This saves a user from having to precisely align the measuring table/standard, thus eliminating further errors.

Preferably, a collimator K (FIG. 2) is selected so that its projection onto the table plane 100a (standard) corresponds to the diameter D (FIG. 1) of the ring 112c on the measurement object 100. Other diameters for the collimator K are also possible and are described below.

After the measurement object 100 has been aligned, it is irradiated with the X-ray radiation RS and, for example, the optical image of the measurement object 100 is captured by the CCD camera 12'. If the setting of the arrangement 10, 20, 100 is ideal with regard to the matching of the light and X-ray fields, the area of the measurement object 100 illuminated by means of the X-ray radiation RS precisely covers the interior of the circle 112c, which can be recognised from the digital image of the CCD camera 12' by means of the determined intensity values of the pixels IS1 of the image area of the digital image corresponding to the interior of the circle 112c. These determined intensity values IS1 are compared with predetermined intensity values IS of the layer 114, which are preferably stored in the controller. If there is a match, at least the measurement object 100 is correctly aligned with the digital camera. Deviations in the illumination of the circle 112c, e.g. a zone that is too large (larger than the circle 112c) or too small (smaller than the circle 112c), indicate a change in the distance between a focal point of the X-ray source 10 and the measuring table 20. This error can be eliminated by adjusting the collimator K or the X-ray optics.

Alternatively or additionally, in the case of non-vanishing deviations, the alignment and/or arrangement of the X-ray source 10 relative to the measurement object 100 can also be changed, for example the distance between the components 10, 20 and/or 100 can be changed by the at least one drive 21, until the area of the measurement object 100 illuminated by the X-ray radiation RS exactly covers the inside of the circle 112c.

The height and/or position of the X-ray source 10 can also be adjusted here relative to the table 20 using an adjustment device.

Lateral displacements between the components 10, 20/100 can also be analysed based on the digital image of the CCD camera 12' and changed, reduced or eliminated by means of the component 21 and/or the adjustment device of the X-ray source 10.

On the basis of one or more digital images recorded by the CCD camera 12' or the image data of said images, error vectors can be determined which characterise an alignment (e.g. angular alignment, in one or more spatial directions), in particular misalignment, and/or arrangement (e.g. distance, e.g. in one or more spatial directions) of the X-ray source 10 in relation to the measurement object 100.

Changing the alignment and/or arrangement of the X-ray source 10 in relation to the measurement object 100, based on the error vectors, can be done manually and/or automatically.

In other words, based on the digital images or the error vectors that can be determined from them, the display (or arrangement and/or alignment) of an optical crosshair of a measuring device with the X-ray source 10 (e.g. for X-ray fluorescence analysis) can now be corrected accordingly so that the user measures at exactly the same point that is also displayed, e.g. by means of the optical crosshair.

Alternatively, a smaller or larger collimator diameter than the collimator diameter mentioned above by way of an example can also be used. The projection of the X-ray radiation RS onto the measurement object 100 associated with the collimator K can be determined using the intercept theorem. Deviations in the projection size and/or position (e.g. arrangement and/or alignment) can also be evaluated with the present deviating collimator diameter values similarly to the embodiments described above, e.g. in order to determine the error vectors for a correction shift of the crosshair (e.g. optical crosshair of a measuring device containing the X-ray source 10).

It is preferable to use the largest collimator diameter available, which can improve the accuracy of the measurement.

A further embodiment relates to configurations in which there is no image sensor or digital camera 12', but only a (photo)detector 12. In these embodiments, the measurement object 100 is positioned on the measurement table 20 such that the crosshairs 112a, 112b (FIG. 1) of the measurement object 100 are illuminated in the centre (intersection 112ab) by a target device that indicates an alignment of the X-ray source RS, e.g. a laser pointer. The measurement is started at the presumed position, i.e. the position indicated by the laser pointer, and the measurement object 100 is thus exposed to the X-ray radiation RS.

The arrangement and/or alignment of the measurement object 100 relative to the X-ray source 10, preferably by an automatic table 20, 21, is varied in an axial direction. This changes the area of the measurement object 100 illuminated by the X-ray radiation RS and thus also the signal ES1 detected by the detector 12, which is generated, for example, by the marking 112, e.g. in the form of a lead structure 112, as a result of the exposure of the measurement object 100 to the X-ray radiation RS. With less illumination of the measurement object 100, the signal strength of the signal ES1 decreases accordingly with the X-ray radiation RS.

A quantity characterising the signal strength of the signal ES1, e.g. a count rate of the detector 12, is determined for, for example, three different relative positions and/or arrangements of the components 10, 100 with respect to each other, including the supposed centre point (indicated, for example by an incidence of the laser pointer signal on the intersection 112ab), a variation along a first spatial direction, e.g. X-variation, and a variation along a second spatial direction, e.g. Y-variation, wherein the X-axis corresponds e.g. to a width extent B1 of the surface 100a of the measurement object 100, and wherein the Y-axis corresponds e.g. to a height extent H1 of the surface 100a of the measurement object 100.

The three count rates associated with the three positions are correlated with an area of the measurement object 100 theoretically illuminated by the X-ray radiation RS, and corresponding error vectors are determined, on the basis of which the alignment and/or arrangement can be changed until a predeterminable alignment is actually achieved which enables precise measurement by means of the X-ray radiation RS.

An increase in accuracy can be sensibly achieved by including further measuring points (in addition to the three measuring points mentioned above as examples).

FIG. 9 describes a further exemplary method for calibrating the X-ray fluorescence device: a) providing 401 a measurement object 100, for example for X-ray fluorescence analysis, b) enabling 402 an efficient and/or precise alignment and/or arrangement of an X-ray source 10 in relation to the measurement object 100 and/or vice versa, c) ensuring 403 that a light field that can be optically detected by a camera, e.g. a digital camera, corresponds to an area ("X-ray field") that can be exposed to X-ray radiation by the X-ray source, for example independently of any components that may be present in a beam path of the X-ray radiation, e.g. collimators, filters, diaphragms, d) checking 404 an alignment and/or arrangement of an X-ray source with respect to the measurement object 100, e) assisting 405 a user with an alignment and/or arrangement of an X-ray source 10 with respect to the measurement object and/or vice versa, f) selecting 406 a collimator and/or another field-shaping element for arrangement in a beam path of the X-ray radiation, g) correcting 407 an alignment and/or arrangement of an X-ray source 10 with respect to a, or the, measurement object 100.

The invention claimed is:

1. Measurement object for calibrating an X-ray fluorescence device which emits an X-ray radiation by means of an X-ray source and comprises a first detector for evaluating an X-ray fluorescence, said measurement object having a main body and at least one marking arranged on the main body, wherein the main body is formed from a first material and the marking on and/or in the main body is formed from a second material which is different from the first material, and the first material emits comparatively low X-ray fluorescence emissions compared to the second material when exposed to X-ray radiation, and the main body has a layer at least in some areas which is aligned with the marking, wherein
the layer emits electromagnetic radiation with an intensity in a predetermined wavelength range in a range between 300 nm and 1100 nm, when exposed to X-ray radiation, and the marking emits X-ray fluorescence radiation with a predetermined intensity when exposed to X-ray radiation.

2. Measurement object according to claim 1, wherein the layer and the marking can be exposed at least partially simultaneously to the X-ray radiation.

3. Measurement object according to claim 1, wherein the second material is a heavy metal and/or the first material is not a heavy metal.

4. Measurement object according to claim 1, wherein a centre of gravity of the layer and a centre of gravity of the marking are congruent.

5. Measurement object according to claim 1, wherein the layer has or is a fluorescent coating.

6. Measurement object according to at least one of the preceding claim 1, wherein the marking has at least two intersecting lines, which are aligned orthogonally to one another.

7. Measurement object according to claim 6, wherein the marking has at least one circle, and the circle is arranged concentrically to a point of intersection of the at least two intersecting lines, and the layer extends over the entire area within the circle.

8. Measurement object according to claim 1, wherein the main body has a platelet shape and/or a thickness of the main body is smaller than at least one external dimension of the main body in a direction perpendicular to the thickness.

9. Method for verifying a calibration of an X-ray fluorescence device comprising an X-ray source emitting X-ray radiation, comprising at least one collimator focusing the X-ray beam or an X-ray optics, and comprising a first detector for evaluating an X-ray fluorescence radiation which is emitted by a measurement object exposed to the X-ray beam,
at least temporarily exposing the measurement object according to claim 1 to the X-ray radiation,
detecting a first quantity of electromagnetic radiation with an intensity of the electromagnetic radiation of the layer of the measurement object with a second detector for the predetermined wavelength range of the layer, and/or
detecting a first quantity of x-ray fluorescence radiation with an intensity of the X-ray fluorescence radiation from the marking of the measurement object with the first detector,
determining a match or a difference of the detected intensity of the first quantity of electromagnetic radiation and the predetermined intensity of the layer and/or
determining a match or difference between the detected intensity of the first quantity of x-ray fluorescence radiation and the predetermined intensity of the marking, and
when determining at least one difference, a misalignment of the measurement object or a readjustment of the first or second detector or both, the at least one collimator or the X-ray optics and/or the X-ray source of the X-ray fluorescence device is detected.

10. Method according to claim 9, wherein
if the detected intensity of the electromagnetic radiation of the layer matches the predetermined intensity of the layer within a tolerance range and if there is a difference between the detected intensity of the first quantity of x-ray fluorescence radiation and the predetermined intensity of the marking, it is determined that the X-ray source, the at least one collimator or the X-ray optics and/or the first detector for detecting the X-ray fluorescence radiation is misaligned and the second detector for detecting the electromagnetic radiation of the predetermined wavelength range is calibrated, or if the detected intensity of the X-ray fluorescence radiation from the marking matches the predetermined intensity of the marking within a tolerance range and if there is a difference of the detected intensity of the first quantity of electromagnetic radiation and the predetermined intensity of the layer, it is determined that the X-ray source, the at least one collimator or the X-ray optics and/or the first detector for detecting the X-ray fluorescence radiation are calibrated and the second detector for detecting the electromagnetic radiation in the predetermined wavelength range is misaligned.

11. Method according to claim 9, wherein
when determining the difference of the detected intensity of the first quantity of electromagnetic radiation and the predetermined intensity of the layer and the difference between the detected intensity of the first quantity of x-ray fluorescence radiation and the predetermined intensity of the marking in a first step, the measurement object is moved on the table and adjusted with respect to the detector and, when a match of the predetermined intensity with the detected intensity of the electromagnetic radiation of the layer is detected, the detection of a match or difference for the intensities of the marking is carried out, or
when determining the difference of the detected intensity of the first quantity of electromagnetic radiation and the predetermined intensity of the layer and the difference between the detected intensity of the first quantity of X-ray fluorescence radiation and the predetermined intensity of the marking, in a first step an adjustment of the measurement object on a measuring table of the X-ray fluorescence device relative to the second detector for detecting the electromagnetic radiation for the predetermined wavelength range is carried out and, when further determining the difference of the detected intensity of the first quantity of electromagnetic radiation and the predetermined intensity of the layer, the readjustment of the second detector for the detection of the electromagnetic radiation for the predetermined wavelength range is determined.

12. Method according to claim 9, wherein a measuring table of the X-ray fluorescence device is moved outside an area of the X-ray radiation,
the measurement object is aligned on the measuring table by a beam device with visible light, which is arranged adjacent to the X-ray source,
the measuring table is moved back into the area of the X-ray radiation,
a determination of the match or difference of the detected intensity of the first quantity of electromagnetic radiation and the predetermined intensity of the layer and/or a determination of the match or difference between the detected intensity of the first quantity of X-ray fluorescence radiation and the predetermined intensity of the marking is carried out, and
a readjustment of the detector for detecting the electromagnetic radiation in a predetermined wavelength range is detected when the difference of the detected intensity of the first quantity of electromagnetic radiation and the predetermined intensity of the layer is determined or a readjustment of the radiation device with visible light is detected when the difference is determined.

13. Method according to claim 9, wherein an alignment of the X-ray source with the measurement object and/or vice versa is carried out before the at least temporary exposure to X-ray radiation, wherein a manual alignment is output by a representation in a display of the X-ray fluorescence device or an automated alignment is activated by a controller of the X-ray fluorescence device.

14. Method according to claim 9, wherein, starting from the first quantity of electromagnetic radiation with the intensity of the electromagnetic radiation, the following is performed: varying an arrangement and/or alignment of the measurement object relative to the X-ray source, repeating the at least temporary exposure of the measurement object to the X-ray radiation and the detection of electromagnetic radiation emitted by the at least one component of the measurement object as a result of the exposure of the measurement object to the X-ray radiation, and determining a change of the first quantity of electromagnetic radiation based on the detected electromagnetic radiation.

15. Method according to claim 14, wherein the following is performed: determining a plurality of values characterising an electromagnetic radiation emitted by the at least one component of the measurement object as a result of the exposure of the measurement object to the X-ray radiation, wherein at least two of the plurality of values are in each case associated with a different arrangement and/or alignment of the measurement object relative to the X-ray source, and determining an alignment and/or arrangement of the X-ray source with respect to information characterising the measurement object by at least one vector, based on the at least two of the plurality of values.

16. Method according to claim 9, wherein the first quantity of electromagnetic radiation is detected by the layer by means of a plurality of digital images of the measurement object, determining a plurality of digital images, each having a different arrangement and/or alignment of the measurement object relative to the X-ray source, and determining information characterising an alignment, for example misalignment, and/or arrangement of the X-ray source with respect to the measurement object, by at least one vector, based on the at least two of the plurality of digital images.

17. The method according to claim 15, comprising: sending the information characterising the alignment and/or arrangement of the X-ray source relative to the measurement object to at least one drive unit in order to change an arrangement and/or alignment of the measurement object relative to the X-ray source, and/or informing a user with respect to the information characterising the alignment and/or arrangement of the X-ray source with respect to the measurement object.

18. Method according to claim 9, wherein it comprises the following steps: a) providing the measurement object for the X-ray fluorescence analysis, b) enabling an alignment and/or arrangement of an X-ray source with respect to the measurement object and/or vice versa, c) ensuring that a field of view that is optically detectable by a camera corresponds to an area that is exposed to X-ray radiation by the X-ray source, independently of components present in a beam path of the X-ray radiation, d) checking an alignment and/or arrangement of an X-ray source in relation to the measurement object, e) assisting a user with an alignment and/or arrangement of an X-ray source in relation to the measurement object and/or vice versa, f) selecting a collimator (K and/or another field-shaping element for arrangement in a beam path of the X-ray radiation, g) correcting an alignment and/or arrangement of an X-ray source in relation to the measurement object.

19. Method according to claim 14, wherein varying again the arrangement and/or alignment of the measurement object relative to the X-ray source based on the change of the first quantity of electromagnetic radiation.

\* \* \* \* \*